Figure 1:
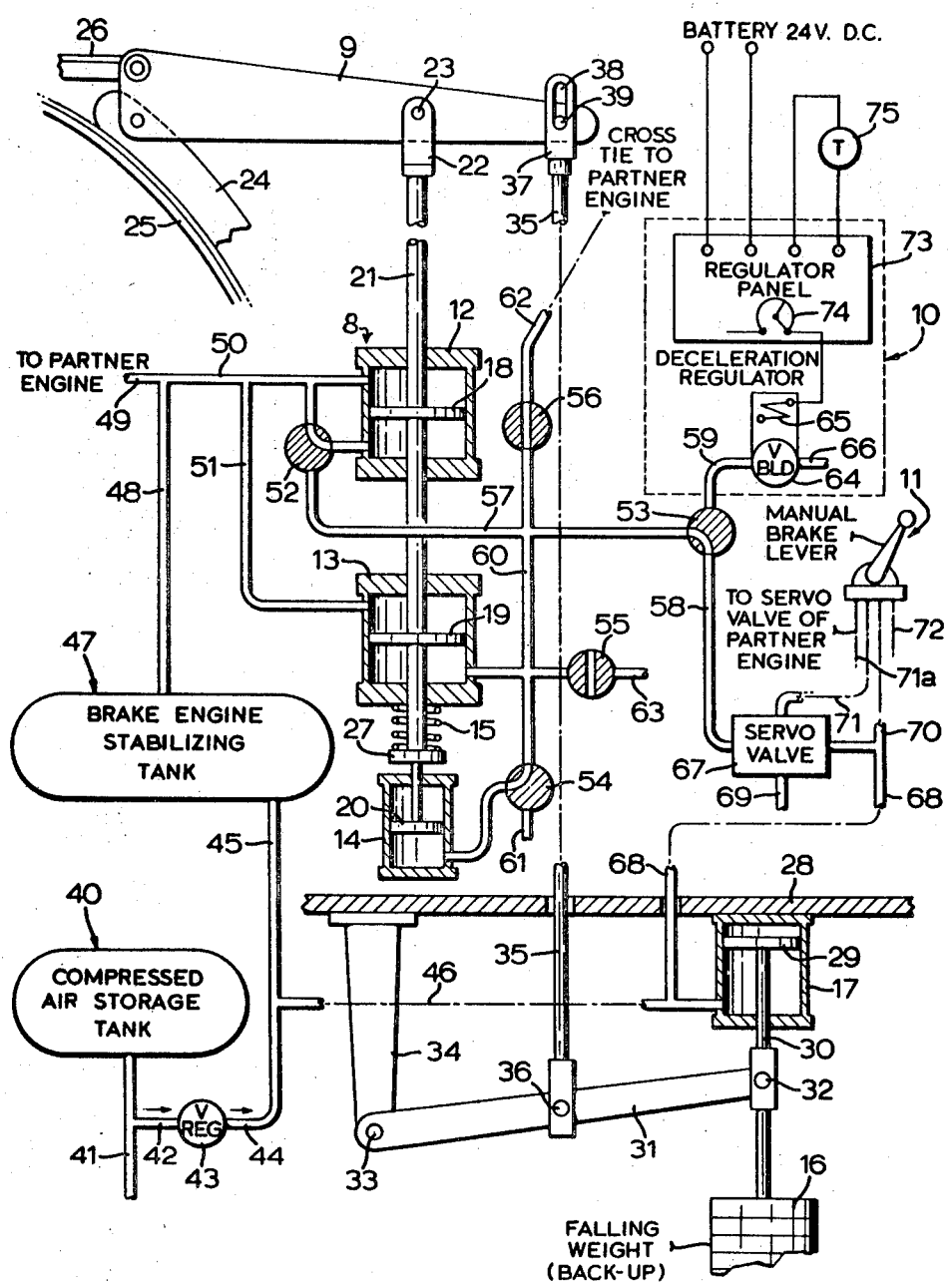

United States Patent

[11] 3,578,817

[72] Inventor Peter De Hertel Eastcott
Peterborough, Ontario, Canada
[21] Appl. No. 859,272
[22] Filed Sept. 19, 1969
[45] Patented May 18, 1971
[73] Assignee Canadian General Electric Company Limited
Toronto, Ontario, Canada
[32] Priority Oct. 26, 1968
[33] Canada
[31] 33617

[54] CONTROL OF MINE HOIST BRAKING
4 Claims, 4 Drawing Figs.
[52] U.S. Cl. .................................................. 303/16,
188/182, 192/2
[51] Int. Cl. .................................................. B60t 7/12
[50] Field of Search........................................... 188/182,
189, 174; 192/2, 17 (A), 17 (C); 303/3, 13—16, 21

[56] References Cited
UNITED STATES PATENTS
2,258,756 10/1941 Gray............................... 188/182X
3,058,547 10/1962 Tiley et al. ....................... 303/15X
3,090,651 5/1963 Clarke............................ 303/15X
3,181,665 5/1965 Trombetta....................... 192/2

Primary Examiner—Duane A. Reger
Attorneys—Raymond A. Eckersley, Frank L. Neuhauser, Oscar B. Waddell and Joseph B. Forman ABSTRACT: The safety controller for a mine hoist usually incorporates some means for giving a warning of an impending emergency stop when the speed of the hoist exceeds the speed called for by the operating program. Instead of an abrupt emergency stop, this invention enables the hoist to make an emergency stop at a controlled rate of slowdown giving about the same smoothness as obtained during normal operation. According to the invention, a brake deceleration regulator, which exercises no control over the hoist while it obeys the program, is placed in control of braking by the warning means on the safety controller when the speed of the hoist exceeds the speed called for by the program by the amount necessary to activate the warning means. The deceleration regulator then brings the hoist to a smooth stop at a fully controlled rate. Since the warning means becomes active at a speed somewhat lower than the speed necessary to bring on a full emergency stop, unregulated emergency stopping will seldom if ever occur. In practice, the deceleration regulator introduces another level of safety into the braking system, a level which produces a smooth stop and reserves the emergency stop for the most extreme conditions conceivable.

INVENTOR.
PETER de H. EASTCOTT

INVENTOR.
PETER de H. EASTCOTT
BY Patchensky

INVENTOR.
PETER de H. EASTCOTT

CONTROL OF MINE HOIST BRAKING

This invention relates to a scheme for improving the braking system of a mine hoist.

For many years now, mine hoists have employed a safety controller to bring about an emergency stop in the event that the main controls fail to hold the speed of the conveyance to a rate determined by an operating program. In the case of manual control, this program represents the skill of the operator, and in the case of automatic control, a predetermined set of slowdown conditions for the controls to adhere to. The safety controller best known and most widely used throughout the mining industry is the so-called "Lilly" controller. This controller is a mechanical device driven by the hoist and set to initiate an emergency stop on the hoist attaining a speed somewhat greater than the rate set by the program. Therefore, in the event that the hoist fails to remain at the speed called for by the program, the safety controller acts to prevent a runaway by initiating an emergency stop. The safety controller also incorporates means for giving a signal warning that the speed of the hoist has exceeded the program, but has not yet reached the speed at which an emergency stop will take place. In hoisting practice to date, this warning means usually sounded a bell or lighted a lamp telling the operator of the impending emergency stop, thereby giving him an opportunity to restore normal control, if possible, or at least giving him a little advance notice of the emergency stop. A warning signal is very helpful when an operator is in attendance, but with automatic controls, as so many hoists have today, such a signal is virtually meaningless. A hoist equipped with automatic controls and out of control increases speed until the safety controller initiates an emergency stop. Since emergency stops are not fully controlled stops, i.e., the brakes are slammed on, they tend to be very abrupt and rough, and are therefore to be avoided if at all possible because they can injure personnel who may be travelling in a conveyance or working in the vicinity of rock thrown from a conveyance due to to the sudden stop.

Instead of an abrupt and rough stop such as that just described, this invention enables the hoist to make an emergency stop at a controlled rate of slowdown giving about the same smoothness as obtained during normal operation. According to the invention, a brake deceleration regulator, which exercises no control over the hoist while it obeys the program, is placed in control of braking by the warning means on the safety controller when the speed of the hoist exceeds the speed called for by the program by the amount necessary to activate the warning means. The deceleration regulator then brings the hoist to a smooth stop at a fully controlled rate. Since the warning means becomes active at a speed somewhat lower than the speed necessary to bring on a full emergency stop, unregulated emergency stopping will seldom if ever occur. In practice, the deceleration regulator introduces another level of safety into the braking system, a level which produces a smooth stop and reserves the emergency stop for the most extreme conditions conceivable.

Figure 2:
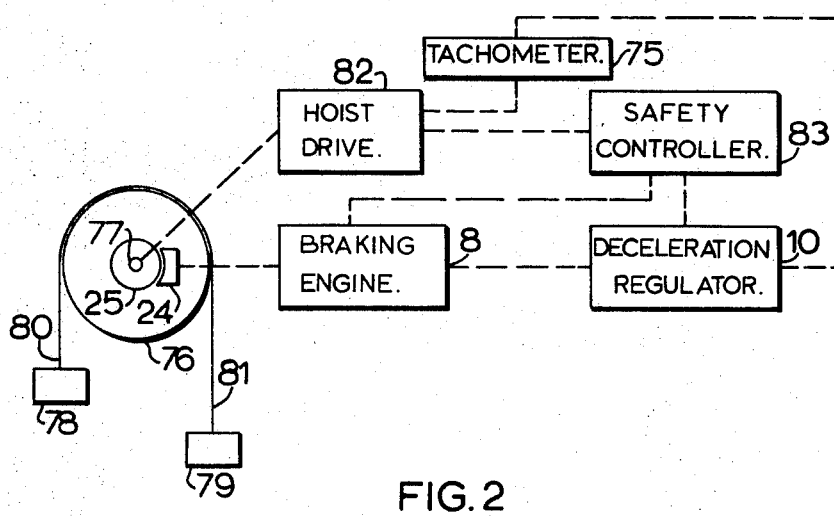
Figure 3:
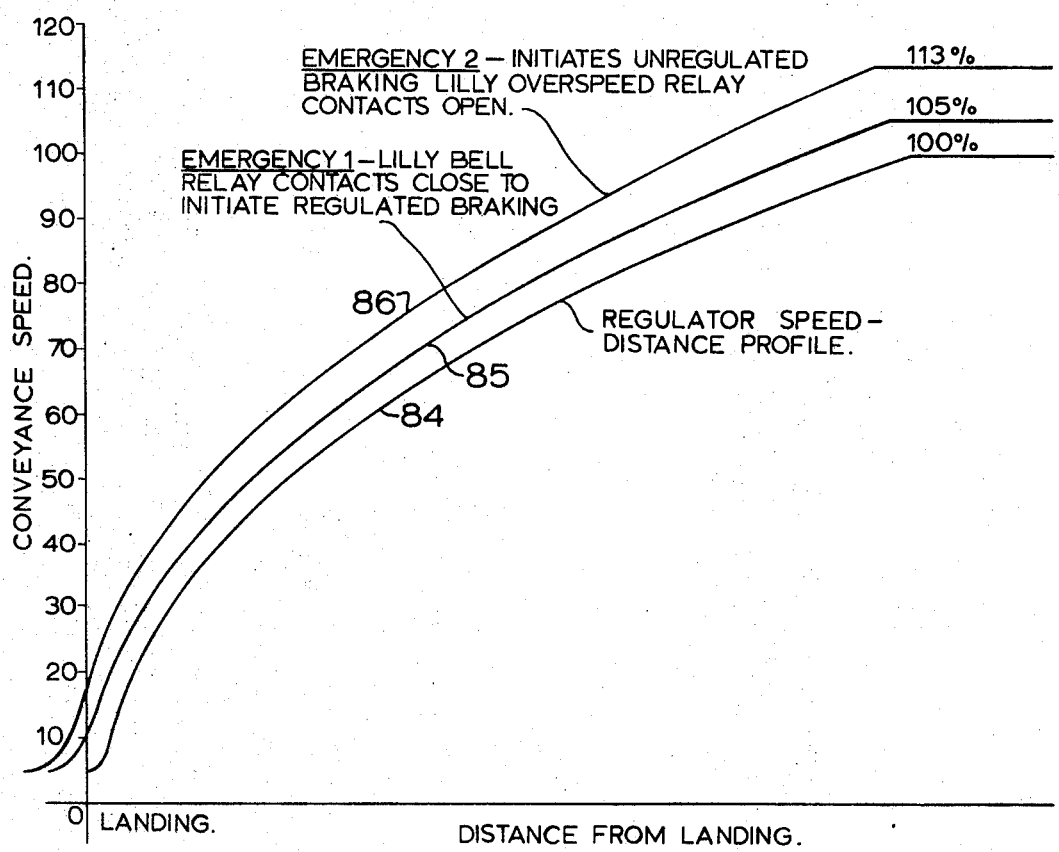
Figure 4:
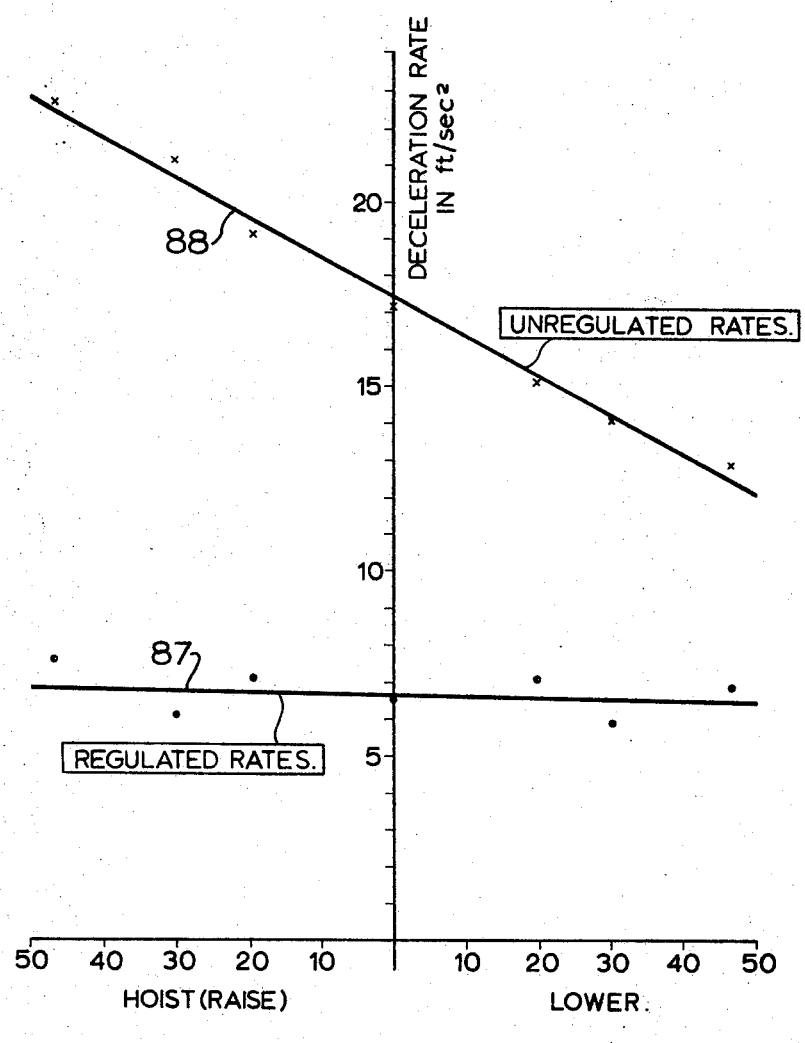

The following detailed specification will aid in a fuller understanding of the invention when taken in conjunction with the appended drawings, in which:

FIG. 1 is a diagram of a mine hoist braking system;
FIG. 2 is a graph showing a number of operating curves;
FIG. 3 is a block diagram of a braking system embodying the invention; and
FIG. 4 is a graph of braking tests made on a hoist.

This invention may be applied to either the drum winder type of hoist or the friction hoist with about the same facility. It will, however, be described in detail as applied to a drum winder of the type described in the applicant's U.S. application, Ser. No. 859,345, filed Sept. 19, 1969 (C-1648).

Drum winders usually have two separate conveyances of which one acts as a counterbalance for the other. The cable winding apparatus has two separate drums coupled together by means of a clutch and the ropes oppositely wound on the drums so that as one drum takes on rope the other lets out rope. Since one drum must be capable of operating alone while the other is braked for purposes of changing the operating level, a braking engine is provided for each. To change levels, the operator uses the clutch to release one drum from the drive and holds it stationary with its brake while he operates the other drum by means of the drive and its brake. When the two drums are coupled together, the operation will be referred to hereinafter as "balanced hoisting," and when the two drums are uncoupled, the operation will be referred to as "single line" hoisting. This is known as two levels of braking, one level for balanced operation and another higher level for single line operation.

In FIG. 1 there is shown the equipment necessary for operating the brakes of one drum of a two drum winder, the other drum being braked in the same way by means of similar equipment. The equipment includes a pneumatic engine 8 coupled mechanically to a brake arm 9, a deceleration regulator 10, and manual control 11. The power drive of the engine consists essentially of two pneumatic brake applying cylinders 12 and 13, a pneumatic brake releasing cylinder 14, a compression coil spring 15 for priming the brakes, and a heavy weight 16 held up in an elevated position by means of a pneumatic cylinder 17. Cylinders 12, 13 and 14 are held stationary in axial alignment and have there pistons 18, 19 and 20 attached to a common rod 21 which has a clevis 22 on its upper end pivotally connected to the outer end of arm 9, i.e., right end, by means of pin 23. Movement of pistons 18 and 19 downward drives arm 9 clockwise to apply the brakes and movement of the rod upward releases the brakes. The brake itself is well known, consisting of a brake drum 25 and a pair of brake shoes located on opposite sides of the drum, one of which is shown at 24. The lower end of each shoe pivots on a pin and the upper ends of the shoes are connected to the inner end of arm 9, shoe 24 directly and the other shoe through a tie rod 26. Hence, when the arm is turned clockwise, shoe 24 and its companion shoe are forced against brake drum 25, thereby braking motion of the drum. Turning the arm counterclockwise causes the shoes to move away from the drum, releasing the brakes. Spring 15 surrounds rod 21 and is compressed between the bottom end of cylinder 13 and a collar 27 on the rod so that the energy stored in the spring always acts to apply the brakes. Cylinder 17 is mounted on a base structure 28 with its axis vertical and has its piston 29 attached to a rod 30 which hangs vertically downward from the piston and supports weight 16 on its lower end. Air under pressure in cylinder 17 under its piston 29 holds the weight up; however, should this pressure be lost due to a loss of pressure in the engine, the weight drops and applies the brakes. This is an emergency device which stops the hoist and holds it stopped until the pressure is restored or other measures taken to operate the brakes on an emergency basis. The falling of weight 16 drives arm 9 clockwise through the following mechanism; an arm 31 pivotally connected at one end 32 to rod 30 and at the other end 33 to a stationary support 34; a rod 35 pivotally connected at its lower end 36 to a mid point of arm 31; and a clevis 37 secured to the upper end of the rod and slotted at 38 for loosely receiving a pin 39 secured to the outer end of arm 9. The slot and pin constitute a lost motion linkage which allows the braking arm to move freely of the emergency falling weight mechanism during normal braking operations, but also allows the weight to apply the brakes after it has fallen a certain distance.

The pneumatic equipment used in the engine with the double cylinder drive will now be described. Whenever reference is made to a line this means an air line or pipe used for conveying air from one point to another. Compressed air is supplied to a storage tank 40 by way of line 41 from a suitable source of air compressed at a relatively high pressure. This air is led off line 41 into a line 42, through a valve 43 which reduces the pressure of the air to about 70 p.s.i., into a line 44 which branches off into two lines 45 and 46. Line 45 goes to another tank 47 where a large volume of compressed air is stored at 70 p.s.i. as a stable source of air of the proper operating pressure, and line 46 goes to cylinder 17 on the under side of its piston 29 where the pressure acts on the piston to hold weight 16 up in its elevated position. An outlet line 48 from tank 47 branches off at 50 to engine 8 and at 49 to a similar engine for braking the other drum. This other engine is known as the partner engine. Line 50 allows compressed air to flow directly from tank 47 into cylinder 12 above its piston 18, and a takeoff line 51 allows compressed air to flow directly from tank 47 into cylinder 13 above its piston 19. Since the upper sides of these pistons are at all times exposed to the full thrust of the compressed air in tank 47, both pistons are continually urged downward at the maximum push that the compressed air is capable of. The force urging the pistons downward acts on both pistons in a direction to apply the brakes, i.e., it tends to drive rod 21 downward and thereby arm 9 clockwise. Hence the upper ends of the two cylinders are always charged for full braking by virtue of their direct connection to tank 47. Control of the braking applied is effected through the control of the air to the under side of pistons 18 and 19.

Numerals 52, 53 ad 54 denote selector valves and numerals 55 and 56 off-on valves. These are all two-position magnet valves which take the position shown when electrically energized and their other positions when deenergized. In the energized positions shown, valve 52 connects line 50 to the bottom end of cylinder 12, valve 53 connects line 57 to line 58, and valve 54 connects line 60 to the bottom end of cylinder 14; in their deenergized positions, valve 52 connects the bottom end of cylinder 12 to line 57, valve 53 connects line 57 to line 59, and valve 54 connects the bottom end of cylinder 14 to an exhaust output 61. As clearly shown in the drawing line 60 is interconnected with line 57, and is connected to the bottom end of cylinder 13. In the energized positions shown, valve 55 is closed and valve 56 is open so as to connect line 60 to a line 62 going to the other braking engine; in their deenergized positions valve 55 is open so as to vent the bottom ends of cylinder 13 and lines 60 and 57 to the atmosphere through the exhaust outlet 63, and valve 56 is closed. A normally open bleed valve 64 is closed by electrically energizing its coil 65 from deceleration regulator 10 so as to connect line 59 to an exhaust outlet 66. This normally open valve is closed on command from regulator 10 by the energy applied to coil 65. A servo valve 67 is connected to line 58 and to a line 68 communicating with the high pressure line 46, and has an exhaust outlet 69. It is operated by means of compressed air, and its operation is controlled through manual control 11 which is connected to line 68 and the servo valve via lines 70 and 71 respectively.

Manual control valve 11 may be any one of a number of well known manually adjustable pressure regulating valves which receives air from line 70 at high pressure and delivers this air to line 71 at a pressure reduced in direct proportion to the setting of its handle. This handle is movable manually between two extreme positions; in one extreme position the air in line 71 is at atmospheric pressure and in the other extreme position it is at the full pressure in line 70. Hence, valve 11 can increase the pressure in line 71 by moving its handle in the direction which admits more air from line 70 and decrease this pressure by moving the handle in the other direction which exhausts air from line 71 via the exhaust outlet 72. The air pressure in line 71 controls servo valve 67, and it in turn controls the pressure of the air fed into line 58 from line 68. Servovalve 67 is a volume amplifier which continuously regulates the air pressure in line 58 according to the pilot pressure from line 71. An increase in pilot pressure causes the servo valve to increase the pressure in line 58 from line 68, and a decrease in pilot pressure causes the servo valve to decrease the pressure in line 58 by exhausting air from this line to the atmosphere through outlet 69. Thus the air pressure in line 58 is essentially proportional to the position of the handle on valve 11 at all times. Another line 71a, carrying the same air pressure as line 71, goes to a servovalve like 67 for the partner engine.

FIG. 2 is a simple block diagram of a mine hoist drive incorporating the braking engine, the deceleration regulator and the brakes described above. In this figure, the two cable winding drums are illustrated as a sheave 76 mounted for rotation on an axle 77, the two conveyances as boxes 78 and 79 suspended from the sheave on ropes 80 and 81, and the brakes by the drum 25 on the sheave and the shoe 24 coupled to the braking engine. The cable winding apparatus is driven by drive 82 coupled mechanically to shaft 77, and the shaft is secured directly to one drum and indirectly to the other drum through a clutch as described above. The system also includes a safety controller 83, usually of the Lilly type, and a tachometer 75 which is driven by drive 82 and has its output side connected to the deceleration regulator.

Drive 82 may be well known DC equipment including a DC motor, the controls therefor, and also controls for automatically braking the hoist. In a DC drive, braking at the higher speeds will be electrodynamic, and at the lower speeds and stopping it will be mechanical. Braking engine 8 will be brought into operation at the appropriate time and placed in the slowdown cycle by means associated with the control of the drive. Automatic control of braking is, of course, an alternative to the manual control shown at 11 in FIG. 1 and one or the other may be used. It is designed to automatically regulate deceleration of the drive to a program such as the speed-distance profile shown at 84 in FIG. 3. In this graph, the abscissa represents the distance that the conveyance is from its landing, i.e., the point at which it will stop, and the ordinate the speed of the conveyance expressed in percent of the full speed that the conveyance normally travels between landings. If braking is on manual rather than automatic control, the operator will attempt to manipulate control 11 so that the conveyance slows down at a rate coming as closely as possible to profile 84.

Safety controller 83, e.g., the Lilly controller, is essentially a mechanical device driven by the hoist and coupled with the deceleration regulator and the braking engine for initiating operation thereof in response to overspeed signals of predetermined magnitudes. It has a cam which follows the conveyance, and the cam has a lobe for each slowdown interval. The controller also has a fly ball governor which follows the speed of the drive and cooperates with a cam operated mechanism to define the speed-distance profile shown at 86 in FIG. 3. This profile is at a speed about 13 percent higher than the normal profile 84 at the beginning of the slowdown. Controller 83 is coupled with braking engine 8 so as to cause it to apply the brakes should the speed of the drive rise to profile 86. This will be an emergency stop where the air is suddenly released from the bottom end of one or both of the brake cylinders 13 and 12. In the case of the Lilly controller, the emergency stop will be initiated by the operation of electrical contacts in the controller. These contacts are in an electrical circuit with electromagnetic exhaust valves.

The safety controller also incorporates auxiliary means activated at overspeeds represented by a third profile 85 lying inbetween profiles 84 and 86 at about 5 percent above profile 84 and about 8 percent below profile 86. In prior art practice, this auxiliary means was coupled with a warning device, such as a bell, and when it became active the bell sounded an alarm warning the operator, if one was present, that the hoist was not slowing down in the normal way defined by profile 84, and as a result an emergency stop of the kind mentioned in the previous paragraph was to be expected. According to the invention this auxiliary means is coupled with deceleration regulator 10, and when it becomes active it places the deceleration regulator in control of braking engine 8. As a result the engine now makes a braked stop of about the same smoothness as a regular stop. Hence an abrupt emergency stop is avoided, and the emergency braking which is initiated from profile 86 is held in reserve as a second line of emergency stopping. In the case of the Lilly controller, this auxiliary means is usually a set of electrical contacts known as the "bell contacts" because they cause the bell to ring, signailing the emergency conditions. In this invention, these contacts are used to place the deceleration regulator in control of the braking engine. The invention provides for two separate levels of emergency stopping, the first being a fully regulated stop and the second the single unregulated emergency stop of the prior art.

The various modes of operation will now be outlined under different headings.

MANUAL CONTROL

In the condition illustrated in FIG. 1, the drums are coupled together for balanced hoisting. During balanced hoisting the two braking engines operate together, but during the time that the clutch is released the two engines operate independently. Under balanced conditions, valves 52, 53, 54, 55 and 56 are energized and in the positions shown. As a result both engines operate together on their lower cylinders 13, the upper cylinders 12 being inactive because both ends of piston 18 are at full system pressure. Assume now that the brakes are applied and the operator wishes to release them. To do so he manipulates the lever of control 11 to the position where it causes servovalve 67 to apply compressed air to the bottom ends of cylinders 13 and 14 at the pressure set by the lever. This air flows from tank 47 via lines 45, 46 and 68, servo valve 67, line 58, valve 53, lines 57 and 60 to cylinder 13 and valve 54 to cylinder 14. As compressed air is applied to the under side of piston 19, its downward thrust decreases, relaxing the braking force applied to arm 9. When the pressures below and above piston 19 equalize, the only braking effort remaining is that due to spring 15 and the weight of arm 9, rod 21 and pistons 18, 19 and 20. At this point, however, the lower end of cylinder 14 is at system pressure, and as a result its piston 20 urges rod 21 upward against the force of spring 15 just enough to free the brake shoes from the brake drum. To apply the brakes again, the operator manipulates the lever of control 11 into the position where it causes servovalve 67 to decrease the pressure in the bottom ends of cylinders 13 and 14 by allowing air to escape therefrom via valve 54, lines 60 and 57, valve 53, line 58, valve 67 and outlet 69. As the pressure below piston 19 decreases, the higher pressure above the piston forces it down to apply the brakes again. Control 11 and servovalve 67 are so designed that the air pressure can be accurately controlled so that either releasing or applying the brakes will be as smooth as the skill of the operator. It is to be noted that during the normal braking operation just outlined that valve 56 remains open; as a result, the lower cylinder of the other braking engine operates in synchronism with cylinder 13, releasing or applying the brakes of the other drum in synchronism with braking operations of this drum.

If the operator now wishes to change the level from which the conveyances operate, he locates the conveyance attached to one of the drums at the new level, and follows certain procedural steps in relocating the other conveyance. Interlocking devices demand that these steps follow a particular pattern, which in general are as follows: (1) The operator sets valves 52 in both engines so they activate the upper brake cylinders, in which setting valve 52 connects the bottom end of cylinder 12 to line 57. Cylinder 12 will now assist cylinder 13 in the braking because its piston 18 is subjected to the same pressure differential as piston 19. (2) He applies the brake fully to both drums by exhausting air from the bottom ends of both cylinders. (3) He isolates the other braking engine from engine 8 by closing valve 56 and setting any other controls provided for this purpose. (4) With the brake shoes for drum 25 now clamped firmly on the drum by means of both cylinders 12 and 13, he places the conveyance attached to the other drum in the proper location for balanced hoisting from the newly selected level. (5) He engages the clutch and restores the system to its former state of single cylinder braking. The procedure outlined above is, of course, an over simplification of the actual situation; it is intended only to illustrate in a very general way the main purpose of the two-cylinder braking engine. It requires very little knowledge of hoisting to realize that much more braking effort is required for uncoupled drums than for counterbalanced drums; the second cylinder in each engine supplies the additional effort. The application of two-cylinder braking is not necessarily restricted to level changing; it can be applied whenever the operator feels that there is a need to do so.

AUTOMATIC CONTROL

A DC drive is used most frequently because a DC motor has the desired speed-torque characteristic and its speed is readily controlled for both driving and braking, i.e., driving the load or being driven by the load with the motor acting as an electrodynamic brake. The regulator for controlling the speed of the motor includes means for producing an electrical reference signal representing the speed-distance profile shown at 84 in FIG. 3. It also includes means for measuring the speed of the drive, e.g., a tachometer generator, and means for comprising this speed signal with the reference signal to produce a third signal which is applied to control the drive so as to hold the speed of the motor to that of the profile. Near the end of each slowdown for a stop, the regulator transfers the control of braking over the engine 8, and it then applies the mechanical brakes to complete the stop.

The procedure outlined under "Manual Control" and "Automatic Control" are for stopping the hoist during normal operating conditions. Control of braking during abnormal conditions will now be dealt with.

EMERGENCY STOPPING

If the means of normal speed control, either manual or automatic, is unable to maintain proper control as defined by profile 84, the safety controller acts to prevent runaway of the hoist. This it does in two steps, namely, a first step involving a regulated emergency stop, and in the event that the first step fails, a second step involving an unregulated emergency stop. If the speed of the hoist exceeds the speed of profile 84 by approximately 5 percent, i.e., it reaches profile 85, the auxiliary means of safety controller 83, e.g., the bell contacts of the Lilly controller, operate and in so doing place deceleration regulator 10 in control of braking engine 8 by deenergizing valves 53 and 54 of both engines. During normal operation, valve 53 is energized and in the position shown in FIG. 1, in which position it disconnects the braking engine from the deceleration regulator. Valve 54 now vents cylinder 14 to the atmosphere, allowing spring 15 to bring the brake shoes into light contact with the brake drum. Valve 53 connects line 57 to line 59 so that the bottom end of brake cylinder 13 can now be vented to the atmosphere through bleed valve 64 which is normally open and deenergized. The rate of exhausting air from the brake cylinder is now controlled by the bleed valve through energizing its coil 65 by deceleration regulator 10. As the coil is energized, the valve closes, allowing the proper amount of air to escape from line 59 via outlet 66 for a regulated braking operation. The regulator includes a rate regulator 73 having a potentiometer 74 for setting a value of deceleration for the hoist. Since tachometer 75 is driven by the hoist it generates a voltage which represents the actual deceleration of the hoist. This voltage is applied to the deceleration regulator where it helps to exercise control over braking. As the brakes decelerate the hoist, the voltage from the tachometer generator falls in direct proportion to the decrease in speed. The rate regulator monitors these changes in tachometer voltage and when the rate of voltage change e is equal to or exceeds the set value, the regulator causes valve 64 to close so as to prevent a further increase in the deceleration rate. In the event that the rate of deceleration drops below the set value, the regulator will call for an increase of braking by opening valve 64 for a short interval. By this means the regulator holds deceleration at the set value. At the instant that the winder comes to rest, the tachometer voltage becomes zero. Sensing this through  falling below the reference from potentiometer 74, the regulator causes the brakes to be fully applied. The regulator is provided with a discriminating circuit by means of which it senses a difference between a decrease in speed in the forward direction and an increase in speed in the reverse direction; consequently, even though a few feet of rollback may occur, there is no possibility of the deceleration regulator interfering with full brake application. During deceleration, the brakes are applied by only one of the two cylinders available for braking purposes; as a result, smoother braking is possible than with an equivalent single cylinder engine.

Deceleration regulator 10 is fail safe in that bleed valve 64 is normally open and must be energized from the regulator to hold off some of the braking effort that it would otherwise allow. Deenergizing coil 65 allows valve 64 to open fully, and this allows the air to escape freely from the lower end of cylinder 13 via lines 60 and 57, valve 53, line 59, valve 64 and outlet 66. Hence cylinder 13 immediately applies the brakes fully without any control of the rate of application.

If by chance, which would be remote indeed, the deceleration regulator fails to hold the speed of the hoist down to profile 85, the safety controller will initiate a second emergency stop on the speed increasing to profile 86. This second emergency stop will be an unregulated operation during which the brakes are applied as rapidly as possible. Upon the speed reaching profile 86, the safety controller immediately deenergizes valves 54 and 55 in both engines, thereby allowing the air to escape freely from the lower ends of cylinders 13 and 14 so that the brakes are applied as rapidly as possible. In the event that valve 52 is deenergized at this time for purposes of a two cylinder braking effort, i.e., during the time that the clutch is released and there is no counterbalancing of the two conveyances, cylinder 12 will also take part in the emergency stop. Although valve 53 has already been deenergized by the bell contacts, it will be deenergized again in the event that the bell contacts failed to do so. Deenergizing valve 53 shuts off the supply of compressed air from line 58 to line 57.

The braking engines are designed for fail safe operation under emergency conditions such as follows: (1) If the engine fails through loss of its air pressure, the piston of cylinder 17 is no longer able to hold up weight 16. As the weight descends, it applies the brakes through its mechanical linkage 30 to 39 with brake arm 9. (2) If the electric power from the main source fails a standby battery takes over immediately and maintains normal braking operation for the emergency stop. (3) In the event that valves 52 to 55 should become deenergized through failure of the battery as well as the main source, valve 52 connects the bottom end of cylinder 12 to line 57, valve 53 connects line 57 to line 59 and thereby shuts off the air supply from line 58, valve 54 vents the bottom end of cylinder 14 to the atmosphere through its outlet 61, and valve 55 vents the bottom ends of cylinders 12 and 13 to the atmosphere through its outlet 63. This applies the brakes and stops the hoist, probably much more abruptly than otherwise. This is a highly unlikely situation indeed.

FIG. 4 is a graph of tests made on a 16.5 feet in diameter double drum hoist fitted with braking equipment of the type described above. Curves 87 and 88 show the behavior of the hoist under the same conditions for regulated and unregulated braking. Curve 87 was obtained from braking regulated by means of a deceleration regulator such as 10 placed in control of braking by the operation of the bell contacts of a Lilly controller, upon the speed of the hoist rising above normal to profile 85, and curve 88 was obtained from an unregulated braking initiated by the Lilly controller upon the speed of the hoist rising to profile 86.

A great advantage of two level stopping of this nature is that it permits the use of conventional equipment, and thereby avoids the elaborate and expensive braking systems which might otherwise be necessary to meet the safety standards of mine regulating bodies.

I claim:

1. In a mine hoist, a drive for driving said hoist, brakes for braking said hoist, means for regulating acceleration and deceleration of said hoist for normal operation to a speed-distance program, and a system for operating said brakes for providing two levels of emergency stopping of the hoist during overspeeds thereof, the first emergency stop being a fully regulated stop initiated at hoist speeds exceeding the speeds set by said program by a first predetermined amount, and the second emergency stop being an unregulated stop initiated at hoist speeds exceeding said first predetermined amount by a second predetermined amount, said braking system comprising an engine for operating said brakes; a deceleration regulator for controlling said engine for making said regulated stop; a safety controller driven by said drive and incorporating first and second operating means operative at said first and second predetermined amounts of speed respectively; means for operatively coupling said deceleration regulator with said engine; means responsive to normal operation of said hoist for maintaining said coupling means uncoupled from said deceleration regulator; means activated by said first operating means on the safety controller causing said coupling means to couple said deceleration regulator to said engine for control of the engine by the deceleration regulator so that the engine applies the brakes to make said first emergency stop; and means activated by said second operating means on the safety controller causing said engine to apply said brakes so as to make said second emergency stop.

2. The hoist braking system of claim 1 wherein said braking engine is manually controlled to a speed-distance program representing the skill of the operator.

3. The hoist braking system of claim 1 wherein said drive is an electric drive adapted for control of acceleration and deceleration of the hoist during normal operation, and said brakes and engine for control thereof are used for final stopping and said two emergency stopping operations.

4. In a mine hoist, a drive for driving said hoist, brakes for braking said hoist, means for regulating acceleration and deceleration of said hoist for normal operation thereof, and a system for operating said brakes for providing emergency stopping of the hoist at two different values of hoist overspeeds, said braking system comprising an engine for operating said brakes; a deceleration regulator for controlling said engine for making a regulated emergency stop, said deceleration regulator exercising no control over said engine during said normal operation; a Lilly safety controller driven by said drive, said controller having one means operable by overspeeds of a predetermined pattern and other means operable to somewhat lower overspeeds; means connecting said Lilly controller to said deceleration regulator for initiating operation thereof in response to the operation of said other means on the Lilly controller; and means connecting said Lilly controller to said engine for initiating an unregulated emergency stop in response to the operation of said one means on the Lilly controller.